US012643271B2

(12) United States Patent
Fries

(10) Patent No.: US 12,643,271 B2
(45) Date of Patent: Jun. 2, 2026

(54) METHOD FOR MANUFACTURING AN ACTUATING APPARATUS FOR A VEHICLE DOOR HANDLE ASSEMBLY, ACTUATING APPARATUS, AND VEHICLE DOOR HANDLE ASSEMBLY

(71) Applicant: Illinois Tool Works Inc., Glenview, IL (US)

(72) Inventor: Elmar Fries, Röttingen (DE)

(73) Assignee: Illinois Tool Works Inc., Glenview, IL (US)

( * ) Notice: Subject to any disclaimer, the term of this patent is extended or adjusted under 35 U.S.C. 154(b) by 114 days.

(21) Appl. No.: 18/623,932

(22) Filed: Apr. 1, 2024

(65) Prior Publication Data

US 2024/0391148 A1　Nov. 28, 2024

(30) Foreign Application Priority Data

May 22, 2023　(DE) ..................... 10 2023 113 300.4

(51) Int. Cl.
　B29C 45/00　(2006.01)
　B29C 45/16　(2006.01)
　(Continued)
(52) U.S. Cl.
　CPC ...... B29C 45/1676 (2013.01); B29C 45/0053 (2013.01); E05B 85/12 (2013.01);
　(Continued)
(58) Field of Classification Search
　CPC ............ B29C 45/1679; B29C 37/0028; B29C 45/561; B29B 7/76
　See application file for complete search history.

(56) References Cited

U.S. PATENT DOCUMENTS

| 5,741,446 A | * | 4/1998 | Tahara | ................ B29C 45/1704 |
| | | | | 425/546 |
| 2006/0076712 A1 | * | 4/2006 | Yonemochi | ......... B29C 37/0028 |
| | | | | 264/328.8 |

(Continued)

FOREIGN PATENT DOCUMENTS

JP　　　2010149332 A　　7/2010

OTHER PUBLICATIONS

Examination report dated Feb. 8, 2024 in German application No. 10 2023 113 300.4, (8 pages).

*Primary Examiner* — Kristina R Fulton
*Assistant Examiner* — Thomas L Neubauer
(74) *Attorney, Agent, or Firm* — McAndrews, Held & Malloy, Ltd.

(57) ABSTRACT

The disclosure relates to an actuating apparatus (1) for a vehicle door handle arrangement, such as an inner door handle arrangement. The actuating apparatus (1) is manufactured in a multi-component injection molding method, such as a two-component injection molding method. The actuating apparatus (1) includes a carrier portion (4) made from a first plastic material and a decorative layer (5), in particular integrally connected to the carrier portion (4), made from a second plastic material. When used as intended, the actuating apparatus (1) comprises a first region (9), which faces away from the user in the resting position of the actuating apparatus (1) and at least regionally represents the rear side of the actuating apparatus (1) to be rearwardly engaged by the user when actuating the actuating apparatus (1), and a second region (10), which faces the user and at least regionally represents in particular the visible region of the actuating apparatus (1) in its resting position, in the first region (9) of the actuating apparatus (1), the decorative layer (5) completely covers the carrier portion (4), and, on a (Continued)

surface of at least 50% of the second region (10) of the actuating apparatus (1), the decorative layer (5) covers the carrier portion (4).

16 Claims, 9 Drawing Sheets

(51) Int. Cl.

| | |
|---|---|
| *E05B 85/12* | (2014.01) |
| *E05B 85/16* | (2014.01) |
| *B29K 55/02* | (2006.01) |
| *B29K 69/00* | (2006.01) |
| *B29K 77/00* | (2006.01) |
| *B29K 105/04* | (2006.01) |
| *B29K 105/12* | (2006.01) |
| *B29K 105/16* | (2006.01) |
| *B29L 31/30* | (2006.01) |

(52) U.S. Cl.
CPC .......... *E05B 85/16* (2013.01); *B29C 45/0005* (2013.01); *B29C 45/0013* (2013.01); *B29K 2055/02* (2013.01); *B29K 2069/00* (2013.01); *B29K 2077/00* (2013.01); *B29K 2105/04* (2013.01); *B29K 2105/12* (2013.01); *B29K 2105/16* (2013.01); *B29L 2031/3029* (2013.01)

(56) References Cited

U.S. PATENT DOCUMENTS

| | | | | |
|---|---|---|---|---|
| 2007/0018354 A1* | 1/2007 | Bazzo | ................. | B29C 45/1635 |
| | | | | 264/328.9 |
| 2007/0231575 A1* | 10/2007 | Watanabe | ........ | B29D 11/00326 |
| | | | | 428/411.1 |
| 2009/0174121 A1* | 7/2009 | Hayes | ................. | B29C 45/1671 |
| | | | | 264/261 |
| 2014/0212610 A1 | 7/2014 | Arai | | |
| 2022/0297357 A1* | 9/2022 | Tsukamoto | ........... | B29C 44/424 |
| 2024/0391148 A1* | 11/2024 | Fries | ....................... | E05B 85/16 |

* cited by examiner

15

15

METHOD FOR MANUFACTURING AN ACTUATING APPARATUS FOR A VEHICLE DOOR HANDLE ASSEMBLY, ACTUATING APPARATUS, AND VEHICLE DOOR HANDLE ASSEMBLY

RELATED APPLICATION

The present application claims the benefit of German Patent Application No. 10 2023 113 300.4, filed May 22, 2023, titled "Method for Manufacturing an Actuating Apparatus for a Vehicle Door Handle Assembly, Actuating Apparatus, And Vehicle Door Handle Assembly," the contents of which are hereby incorporated by reference.

BACKGROUND

An actuating mechanism can take the form of a handle, such as a handle lever, which pivots on the housing of a door handle assembly. It's designed for users, particularly vehicle occupants, to open and/or close vehicle doors from inside.

Traditionally, these assemblies, especially the inner door handle parts, are constructed from plastic. However, for aesthetic reasons, there's often a preference for a metallic appearance. Chrome plating has been the go-to solution, providing a high-quality look, but it poses health and environmental risks, mainly due to the use of chromium IV. An alternative to chrome plating involves molding the actuating parts with a plastic that mimics a metallic finish (referred to as mold-in metal color—MIMC). While this method achieves a similar appearance to chrome plating, it comes with its own set of challenges, like surface defects and material durability issues, which also affect the durability of the housing of the door handle assembly.

Given these challenges, an objective is to devise a method for manufacturing the actuating apparatus, especially for producing handle elements in vehicle door handle assemblies, while also introducing a corresponding actuating mechanism. This method should offer cost-effective production, provide high-quality surfaces with ample design flexibility, and ensure good durability.

SUMMARY

The present disclosure relates generally to actuating apparatuses, substantially as illustrated by and described in connection with at least one of the figures, as set forth more completely in the claims. For example, the present disclosure relates generally to actuating apparatuses for a vehicle door handle assembly, in particular an inner door handle assembly. The present disclosure further relates generally to a vehicle door handle assembly, in particular an inner door handle assembly with a corresponding actuating apparatus as well as an optimized method for manufacturing such an actuating apparatus.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
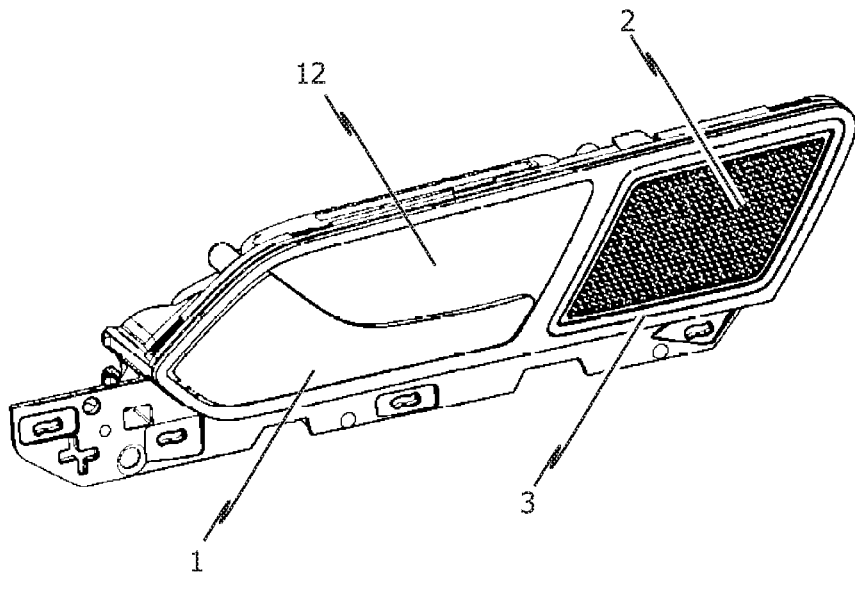
FIG. 1 illustrates schematically, and in an isometric view, an exemplary embodiment of an inner door handle assembly with an actuating apparatus embodied as a handle element according to an exemplary embodiment of the disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y"

means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Accordingly, the present disclosure relates in particular to a method for manufacturing an actuating apparatus for a vehicle door handle assembly, in particular an inner door handle assembly. In the method according to the disclosure, an at least regionally hollow carrier portion is first formed from a first plastic material.

For this purpose, it is provided in particular that the first plastic material is injected as a plasticized compound into a first cavity of a plastic tool. The plastic tool can have a first tool half and a second tool half, which form the first cavity of the plastic tool when in a connected state.

In this context, it is contemplated in particular that the first tool half comprises a lug projecting into the cavity of the plastic tool and having a shape that is at least partially or regionally complementary to the cavity of the carrier portion.

In the method according to the disclosure, it is further provided that a decorative layer is subsequently formed from a second plastic material on the at least partially hollow carrier portion.

In particular, it is provided in the method according to the disclosure that the at least regionally hollow carrier portion is formed by injecting the first plastic material as a plasticized compound into a first cavity of a plastic tool, wherein the plastic tool comprises a first tool molding and at least one second tool molding, which, when connected to one another, form the first cavity of the plastic tool, and wherein the plastic tool comprises a tool molding in the form of a lug protruding into the cavity, which preferably has a shape that is at least partially or regionally complementary to the cavity of the carrier portion.

Accordingly, it is provided according to the present disclosure that the actuating apparatus comprises an at least regionally hollow carrier portion as well as an outer layer, which is formed by the decorative layer integrally connected to the carrier portion. The actuating apparatus is in particular manufactured in a multi-component injection molding process, and in particular in a two-component injection molding process.

According to a further development of the manufacturing method according to the disclosure, it is provided that the second tool half of the plastic tool comprises a first tool molding and a second tool molding. The first tool molding and the second tool molding are movable, and in particular slidable, relative to one another and relative to the lug of the first tool half between a first position in which the two tool moldings form the first cavity with the first tool half, and in particular with the lug of the first tool half, and a second position in which the two tool moldings are disconnected from one another compared to the first position.

Expressed more generally, it is provided in particular that the plastic tool comprises a first tool molding and at least one further second tool molding, which are movable, and in particular slidable, relative to one another and preferably relative to the lug between a first position in which the at least two tool moldings form the first cavity with the lug and a second position in which the at least two tool moldings are disconnected from one another compared to the first position.

Alternatively, it provided for this purpose that, in addition to the tool molding configured as a lug, the plastic tool comprises at least one further tool molding, wherein the tool molding configured as a lug and the at least one further tool molding are movable, and in particular slidable, relative to one another between a first position in which the at least two tool moldings form the first cavity and a second position in which the at least two tool moldings are disconnected from one another compared to the first position.

With these measures, it is possible to exchange the second tool half of the plastic tool with a third tool half in order to subsequently form the decorative layer on the previously formed carrier portion.

According to implementations of the manufacturing method according to the disclosure, it is provided in particular that the decorative layer is formed by injecting the second plastic material into a second cavity of the plastic tool as a plasticized compound. For this purpose, it is contemplated in particular that the plastic tool comprises the first tool half and the aforementioned third tool half, which form the second cavity of the plastic tool in the interconnected state.

In particular, it is thus contemplated that the decorative layer is formed by injecting the second plastic material as a plasticized compound into a second cavity of the plastic tool, wherein the plastic tool comprises at least two preferably further tool moldings, which, when connected to one another, form the second cavity of the plastic tool, wherein, upon injecting the second plastic material into the second cavity of the plastic tool, the previously formed carrier portion is at least partially supported by the lug.

In a further development, it is provided that the tool molding in the form of the lug is part of a first tool mold half of the plastic tool, wherein the first and the at least one second tool moldings are part of a second tool mold half of the plastic tool, and wherein the at least two preferably further tool moldings that form the second cavity of the plastic tool when connected to one another are preferably part of a third tool half of the plastic tool.

The second cavity of the plastic tool is formed in particular by a third tool molding and at least a fourth tool molding, which are movable, and in particular slidable, relative to one another and relative to the lug between a first position in which the two tool moldings form the second cavity with the carrier portion at least partially supported by the lug and a second position in which the two tool moldings are disconnected from one another compared to the first position.

In particular, it is provided that, when the second plastic material is injected into the second cavity of the plastic tool, the previously formed carrier portion is at least partially and preferably fully supported by the lug of the first tool half.

In this context, as well, it is expedient that the third tool half of the plastic tool comprises a third tool molding and a fourth tool molding, which are movable, and in particular slidable, relative to one another and relative to the lug of the first tool half between a first position in which the two tool moldings form the second cavity with the first tool half, and in particular the carrier portion supported at least partially by the lug of the first tool half, and a second position in which the two tool moldings, i.e., the third tool molding and the fourth tool molding, have been disconnected from one another compared to the first position.

With this measure, it is particularly easy to remove the actuating apparatus formed in the injection molding process from the plastic tool. Of course, other design variants can also be considered here.

According to a preferred implementation of the manufacturing method according to the disclosure, it is provided that the gas is injected into the cavity of the carrier portion and/or that at least regionally the cavity of the carrier portion is foamed out while the carrier portion, along with the decorative layer formed on the carrier portion, remains in the third tool half. The gas injection or the at least regional foaming out of the cavity of the carrier portion can effectively counteract a collapse of the carrier portion.

For injecting gas and/or for at least regionally foaming out the cavity of the carrier portion, the first tool half of the plastic tool is preferably replaced by a fourth tool half, which is configured without a lug projecting into the cavity of the carrier portion.

Particularly preferably, in this context, it is provided that the fourth tool half of the plastic tool is configured such that, when connected with the third tool half of the plastic machine, it forms a gap region that is fluidly connected to the second cavity in such a way that the plastic compound injected into the second cavity can flow into the gap region.

With this easily implemented measure, a nearly complete sheathing of the carrier portion with the decorative layer can effectively be achieved.

In this context, however, it is also contemplated that the fourth tool half comprises at least one lug at least partially or regionally projecting into the gap region formed between the third tool half and the fourth tool half in order to enable a fixation of the molded part.

The present disclosure further relates to an actuating apparatus for a vehicle door handle assembly, in particular an inner door handle assembly.

The actuating apparatus has been manufactured in a multi-component injection molding process, and in particular in a two-component injection molding process.

The actuating apparatus according to the disclosure comprises a carrier portion made of a first plastic material and a decorative layer made of a second plastic material which is integrally connected to the carrier portion.

It is provided in particular that the decorative layer comprises a visible region, which forms the so-called "A-side" of the actuating apparatus. When the actuating apparatus is properly installed, and furthermore in particular in the non-actuated state of the actuating apparatus, the A-side of the actuating apparatus forms the visible side of the actuating apparatus.

The decorative layer is preferably formed from a plastic material that can in particular be different from the plastic material from which the carrier portion of the actuating apparatus is formed.

In particular, the decorative layer is integrally connected to the carrier portion, preferably in a substance-to-substance bond. At least in the installed state, the visible side of the decorative layer corresponds to the aforementioned A-side of the actuating apparatus and is thus at least partially directly visible from the vehicle interior when the actuating apparatus is used for an inner door handle assembly of a vehicle.

The decorative portion, which is preferably formed integrally with the carrier portion of the actuating apparatus, also extends to the so-called "B-side" of the actuating apparatus, i.e., to the side facing away from the A-side of the actuating apparatus.

In this context, it is provided in particular that the actuating apparatus, when properly used, i.e., when properly installed, comprises a first region facing away from the user in the resting position of the actuating apparatus, which at least regionally forms the aforementioned B-side of the actuating apparatus, and the rear side of the actuation apparatus to be at least regionally rearwardly engaged by the user when actuating the actuation apparatus.

Moreover, when properly used, the actuating apparatus comprises a second region facing the user in the resting position of the actuating apparatus, which at least regionally represents, in particular, the A-side of the actuating apparatus and further in particular the visible region of the actuating apparatus in its resting position.

According to the present disclosure, it is provided in particular that, in the second region of the actuating apparatus, the decorative layer completely covers the carrier portion.

On the other hand, according to the disclosure, it is provided in particular that, on a surface of at least 50%, and preferably on a surface of at least 75% of the first region of the actuating apparatus, the decorative layer covers the carrier portion.

According to preferred implementations of the actuating apparatus according to the disclosure, in this context in particular, it is provided that in the first and in the second region of the actuating apparatus, the decorative layer covers the carrier portion continuously and completely.

The decorative layer can be connected to the carrier portion via a pure positive-lock connection.

The first region of the actuating apparatus can be connected to the second region of the actuating apparatus via an edge-shaped or arcuate region.

In other words, a front side of the actuating apparatus is preferably defined by surfaces of the actuating apparatus facing the second region of the actuating apparatus, and preferably by surfaces facing the vehicle cabin, when the actuating apparatus is installed in the vehicle in case of an inner door handle assembly and is in a resting position. The boundary between the front side, i.e., the second region of the actuating apparatus, and the rear side, i.e., the first region of the actuating apparatus, is preferably defined by the surfaces facing parallel to the surface of the vehicle surface that directly surrounds the actuating apparatus in a state when installed in the vehicle and in a resting position.

Preferably, a surface direction points in the direction of its normals, i.e., facing outward, away from the material.

Directly visible preferably means that there is no further coating (e.g., paint, chrome) or overmolding of the decorative layer. The plastic of the decorative layer, i.e., the second plastic material, is preferably the outermost surface layer of the actuating apparatus, in particular in the region of the directly visible regions of the decorative layer, as well as on the rear side of the actuating apparatus to be rearwardly engaged.

The decorative layer is integrally connected to the carrier portion, which preferably means as a substance-to-substance bond, i.e., such that they are held together by atomic or molecular forces and are inseparable and can only be separated by destruction. However, the meaning also comprises a positive locking connection of the decorative layer with the carrier portion, wherein the positive locking is produced by the injection molding process within the plastic tool or injection molding tool. A bond by atomic or molecular forces is therefore not absolutely necessary, but rather preferred.

In this context, in particular, it is provided that the edge-shaped or arcuate region(s) connecting the rear side of the actuating apparatus, i.e., the first region of the actuating apparatus, to the front side of the actuating apparatus, i.e., the second region of the actuating apparatus, are preferably continuously and completely also covered by the decorative layer.

Because, according to the disclosure, a material different than for the carrier portion is used for the decorative layer, the carrier portion and the decorative layer can be specifically adapted to the respective requirements. The particular substance-to-substance bond at the same time forms an integral component such that no additional fastening means are required. This not only improves the visual appearance, but also simplifies the manufacturing and assembly of the actuating apparatus.

The carrier portion of the actuating apparatus according to the disclosure is at least partially hollow in shape. In this context, at least partially hollow means that at least one hollow chamber or a hollow region can be provided in the carrier portion.

This hollow region can be at least partially foamed out and/or filled with a glass fiber-reinforced material at least regionally.

According to implementations of the actuating apparatus according to the disclosure, it is provided that, in a bearing region of the actuating apparatus, the carrier portion comprises bearing means.

The bearing means are preferably formed integrally with the carrier portion and in particular formed at the same time as the injection molding of the carrier portion. With the bearing means in the bearing region of the actuating apparatus, the actuating apparatus can be mounted in an in particular pivotal manner on the vehicle door handle assembly and in particular on a housing of the vehicle door handle assembly.

According to design variants of the actuating apparatus according to the disclosure, it is provided in this context that, except for in the bearing region of the actuating apparatus, the decorative layer completely and continuously covers the carrier portion.

Alternatively or additionally, it can be provided that the actuating apparatus is configured as a body extending at least regionally in a direction along a major axis, wherein the bearing region of the actuating apparatus is formed in particular at an end region of the body.

In particular, it can be provided that the carrier portion in the bearing region comprises at least one bearing block in which the bearing means are arranged at least regionally. The at least one bearing block can be connected at least regionally to the first region and/or second region of the actuating apparatus via an edge-shaped or arcuate region(s).

Preferably, the decorative layer extends at least partially and/or regionally over the edge-shaped or arcuate region(s).

In the manufacturing method according to the disclosure, a gas injection technique can in particular be used in order to fill or foam out the cavity of the carrier portion with gas. In this gas injection technique, cool gas (GIT) can be employed.

Alternatively, a gas injection technique with subsequent gas purging or a gas injection technique with subsequent purging with cooled gas is also contemplated.

In order to ensure the resilience of the actuating apparatus, it is provided in particular that the carrier portion of the actuating apparatus is made of a first plastic material, in particular a glass fiber-reinforced plastic material, wherein the decorative layer consists of a plastic component that is different from the first plastic component.

A plastic material with a metallic appearance is possible for the decorative layer, in particular. Chromium plating, which as explained is problematic for environmental and health reasons, can be omitted.

The decorative layer can have of a substantially smaller thickness than the carrier portion. For example, the greatest thickness of the decorative layer can be less than 50% of the smallest thickness of the carrier portion, preferably less than 20% of the smallest thickness of the carrier portion. As a result, the stiffness of the actuating apparatus provided by the carrier portion can be maximized while maintaining a low slope to surface defects of the decorative layer.

The carrier portion can be made of a reinforced plastic, in particular a glass fiber-reinforced plastic. Particularly good carrier properties can be achieved as a result. In principle, a wide variety of combinations of materials are contemplated for the carrier portion and the decorative layer. Some possible combinations of materials are provided below strictly as examples:

Carrier portion PA6 reinforced/decorative layer PA6 Decor;

Carrier portion PA6 with Cool Touch Effect/decorative layer PA6 Decor;

Carrier portion SAN reinforced/decorative layer PC ABS or ABS;

Carrier portion POM reinforced/decorative layer POM Decor.

The decorative layer can have a color different than the carrier portion. This achieves a particularly high level of design freedom. However, the decorative layer and the carrier portion can generally also have the same color. The decorative layer can be made of a plastic with a metallic appearance. Such plastics with a metallic visual appearance, which can be manufactured in particular by plastic injection molding processes, are well known as such. They have a surface finish similar to chromium plating, but without the environmental and health issues of chrome plating. As explained, precisely such plastics with a metallic visual appearance often do not have the required durability. This problem is solved by the design of the actuating apparatus according to the disclosure, and in particular by the carrier portion.

Preferably, the actuating apparatus can at least regionally be made of a plastic with a cool-touch effect. Mineral fillers or metal particles, in particular ferromagnetic metal particles, can be embedded in the plastic. By embedding a mineral filler or metal particles in the plastic, the cooling typically associated with metal surfaces is achieved, although a plastic material is employed, which can also be processed accordingly in a plastic injection molding process.

For example, the carrier portion can be at least regionally formed from a plastic with a cool-touch effect. In combination with a plastic in a metal look for the decorative layer, this provides a visual and haptic impression of a metal handle for a vehicle occupant.

To increase the cool-touch effect, the carrier portion can be made of a plastic with good thermal conductivity. A plastic in the context of this disclosure preferably exhibits the cool-touch effect if the value measured with the "HapTemp" apparatus developed for this purpose by "ZIEGLER-INSTRUMENTS GmbH" is equal to or less than 19, preferably equal to or less than 15. This instrument is capable of measuring an equivalent of the perceived haptic temperature, wherein steel has a value of 0, glass has a value of 10, and Teflon has a value of 20. These values are based on a "HapTemp" device from 2012 (Serial No. 12.11.1), software version 16.2.8, most recently calibrated in January 2019.

According to the disclosure, the carrier portion is configured at least regionally as a cavity. Plastics with a cool-touch effect or plastics with embedded mineral fillers or metal particles generally have a high density. In order to counteract this, at least one cavity or cavity chamber can be formed in the interior of the carrier portion.

According to a further embodiment, the decorative layer can be bonded to the carrier portion with an in-mold painting method.

In this context, the in-mold painting method is treated as an injection molding method. The manufacturing method generally corresponds to the two-component injection molding method, wherein the second cavity of the plastic tool/injection molding tool, i.e., the cavity forming the decorative layer, is of very low thickness. For example, the second cavity can have a thickness of less than 1 mm, preferably less than 0.3 mm. The component (color) forming the decorative layer is pressed into the second cavity for the decorative layer after formation of the carrier portion and forms a surface similar to a paint after curing. The design freedom with respect to the color of the decorative layer can thus be further increased with high surface quality.

The door handle assembly configured in particular as an inner door handle assembly serves in particular for opening and/or closing a vehicle door from the vehicle interior. To this end, the inner door handle assembly is mounted in the interior of a vehicle, such as a passenger vehicle or a commercial truck. The disclosure accordingly also relates to a vehicle having an inner door handle assembly mounted therein.

The vehicle door handle assembly, which is preferably configured as an inner door handle assembly, comprises a housing, with which it is fastened to a vehicle door. An actuating apparatus that a user, in particular a vehicle occupant, can manually actuate, for example grasp, is arranged on the housing.

The actuating apparatus can be movably supported on the housing, for example in such a way that the actuating apparatus can pivot or is translationally movable. The actuating apparatus can for example be a handle element, in particular a handle lever, arranged to pivot on the housing. However, the actuating apparatus can for example also be a button or the like actuated by a user, in particular a vehicle occupant. The actuating apparatus can be configured in order to be actuated by a vehicle occupant in order to open or close a vehicle door from the interior.

The inner door handle assembly shown in FIG. 1 comprises a housing 12 that allows the inner door handle assembly to be mounted to a door of a vehicle, such as a passenger car or commercial truck.

The housing 12 comprises a handle recess 13 in which an actuating apparatus configured as an actuating element, in the present example a handle element 1, is received in the resting position shown in FIG. 1.

From this resting position, the handle element 1 can be pivoted with its right free end in FIG. 1 out of the handle recess 13 about a pivot axis, for example a vertical pivot axis. By means of a corresponding connection, the vehicle door is unlocked by pivoting out the handle element 1 so that the vehicle door can subsequently be opened by a vehicle occupant. As the handle element 1 is pivoted out, the vehicle occupant reaches into the handle recess 13 and grasps behind the handle element 1. In the example shown, the handle element 1 forms a handle lever. A loudspeaker 2 that is surrounded by a bezel 3 is also integrated in the housing 12 of the inner door handle assembly.

The handle element 1 used in the exemplary embodiment of the vehicle door handle assembly shown in FIG. 1 is shown in various views and in a partially sectioned view in FIG. 2 through FIG. 5.

The handle element 1 is manufactured in a two-component injection molding process and comprises a carrier portion 4 made of a first plastic material and a decorative section 5 integrally connected to the carrier portion 4.

Figure 4:
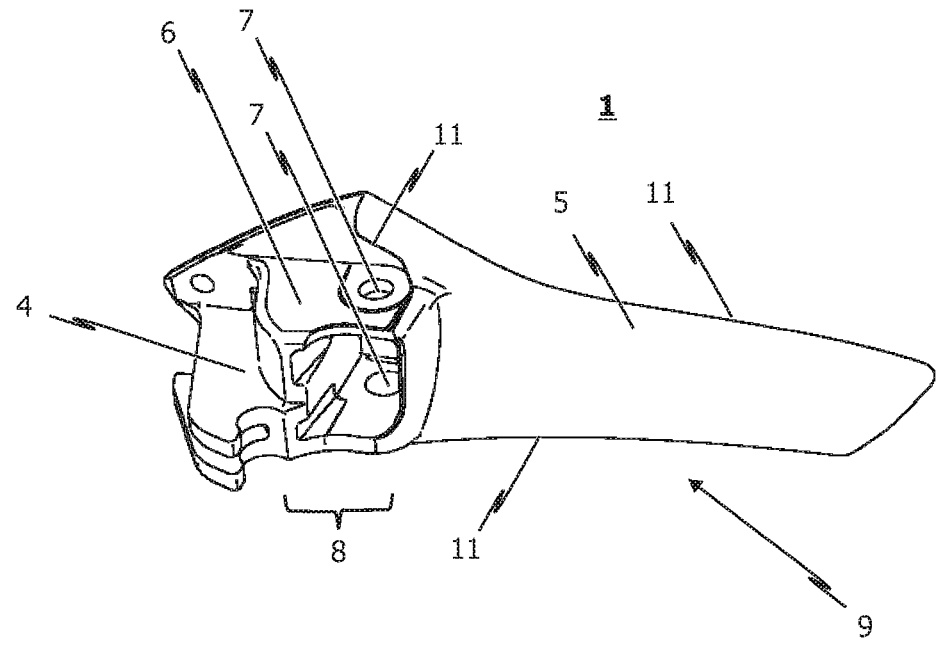
FIG. 4 illustrates schematically, and in a (further) isometric view, the actuating apparatus or handle element of the inner door handle assembly according to FIG. 1.
Figure 5:
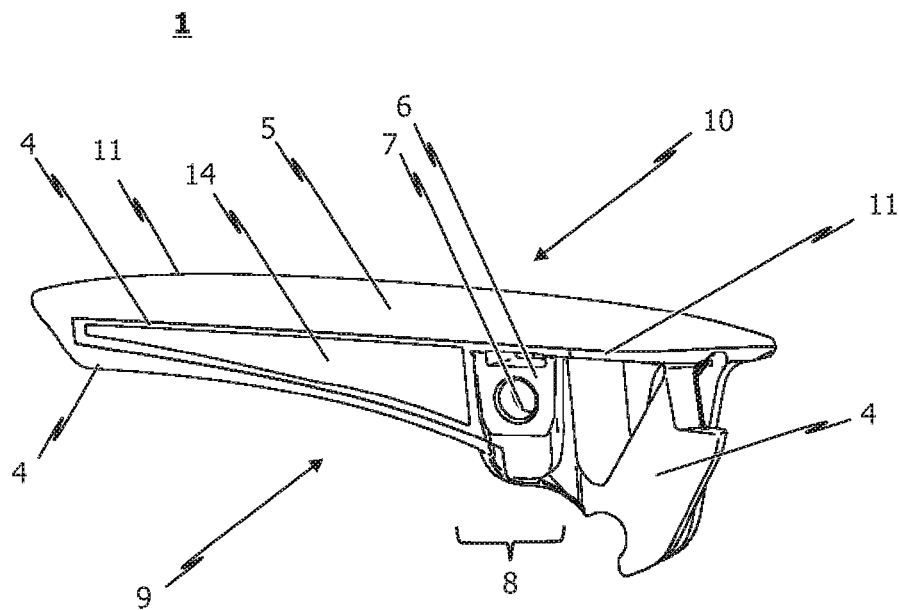
FIG. 5 illustrates schematically and in a partially-cut view, the actuating apparatus or handle element according to FIG. 3.

When used properly, the handle element 1 comprises a first region 9, which faces away from the user in the resting position of the handle element 1, which is particularly visible in FIG. 4. The first region 9 of the handle element 1 at least regionally represents the rear side of the handle element 1 to be rearwardly engaged by the user when operating the handle element 1.

Figure 2:
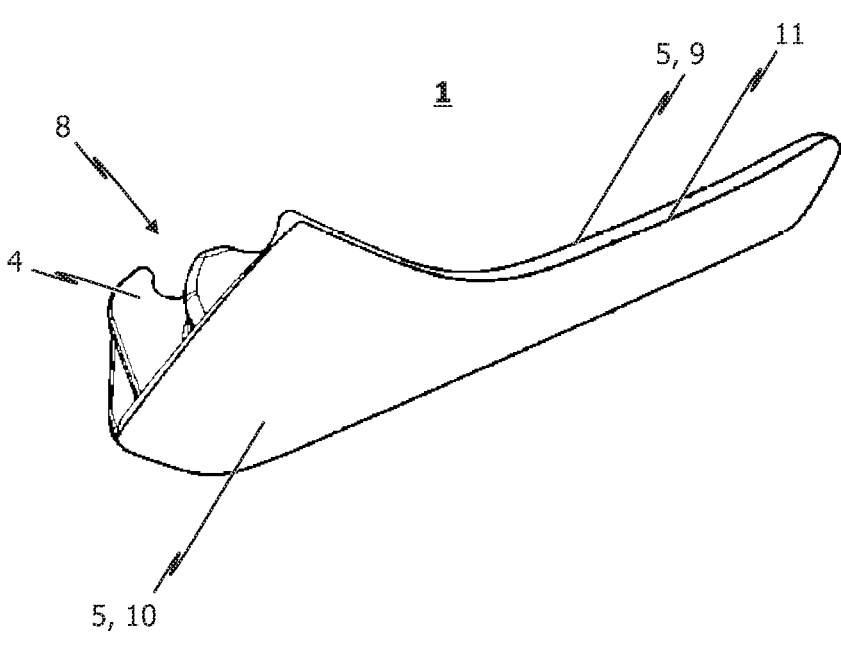
FIG. 2 illustrates schematically, and in an isometric view, the actuating apparatus or handle element of the inner door handle assembly according to FIG. 1, in an enlarged view.
Figure 3:
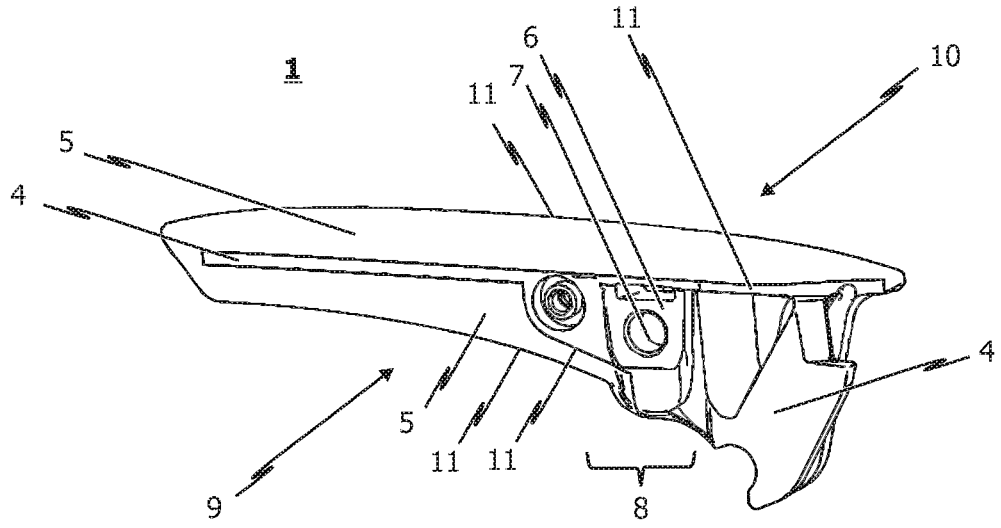
FIG. 3 illustrates schematically, and in an isometric view, the actuating apparatus or handle element of the inner door handle assembly according to FIG. 1.

On the other hand, the handle element 1 comprises a second region 10 opposite the first region 9, which can be seen in particular in FIG. 2. The second region 10 of the handle element 1 in particular at least regionally represents the visible region of the handle element 1 in its resting position.

According to the disclosure, it is provided in particular that in the second region 10 of the handle element 1, the decorative layer 5 completely covers the carrier portion 4.

With regard to the first region 9 of the handle element 1, it is provided that, on a surface of at least 50%, and preferably at least 75%, of the first region 9 of the handle element 1, the decorative layer 5 covers the carrier portion 4.

The decorative layer 5 is connected to the carrier portion 4 in a substance-to-substance bond. In the example shown, the decorative layer 5 has been injected onto the carrier portion 4 with a two-component injection molding method.

The carrier portion 4 is made of a plastic, for example a reinforced plastic, such as a fiberglass-reinforced plastic. The carrier portion 4 can comprise a mineral filler or embedded metal particles, for example ferromagnetic metal particles, which are embedded into the plastic material in such a way that a vehicle occupant perceives a cool surface upon grasping the handle element 1 in order to pivot the handle element 1 out of the handle recess 13 of the housing 12 and thus has the impression of a metal.

Accordingly, the decorative layer 5 can consist of a plastic (mold-in-metal color-MIMC) with metallic visual appearance.

However, the decorative layer 5 can also consist of a different plastic, for example differently colored plastics or the like. The decorative layer 5 could also have been connected to the carrier portion 4 with a substance-to-substance bond in an in-mold painting process.

In the example shown in FIG. 1, the bezel 3 of the loudspeaker 2 has also been injected into the housing 12 with a multi-component injection molding method. For example, the bezel 3 can be comprised of the material used for the decorative layer 5.

As can in particular be seen in the illustration in FIG. 4, it is provided in the exemplary embodiment of the handle element 1 and actuating apparatus according to the disclosure shown in the drawings that the first (rear) region 9 of the handle element 1 is connected via an edge-shaped or arcuate region 11 of the handle element 1, wherein the edge-shaped or arcuate region 11 is also continuously and completely covered by the decorative layer 5.

The handle element 1 further comprises a bearing region 8, in which the carrier portion 4 of the handle element 1 comprises bearing means 7. For example, as shown in FIG. 4 in particular, the bearing means 7 can comprise in particular two coaxial openings for pivotally fastening the handle element 1 to the housing 12 of the door handle assembly.

It can also be seen in the illustration in FIG. 4 that, except for in the bearing region 8 of the operation apparatus 1, the decorative layer 5 preferably completely and continuously covers the carrier portion 4.

As shown, the carrier portion 4 of the handle element 1 in the bearing region 8 can comprise at least one bearing block 6 in which the two coaxial openings are arranged. The at least one bearing block 6 is connected at least regionally to the rear side (with the first region 9) and/or to the front side (with the second region 10) of the handle element 1 via an edge-shaped or arcuate region 11. Preferably, the decorative layer 5 extends at least partially or regionally over the edge-shaped or arcuate region 11.

An exemplary embodiment of the method for manufacturing an actuating apparatus and a handle element 1 according to the disclosure is described in the following with reference to FIG. 6A to FIG. 6G.

Figure 6A:
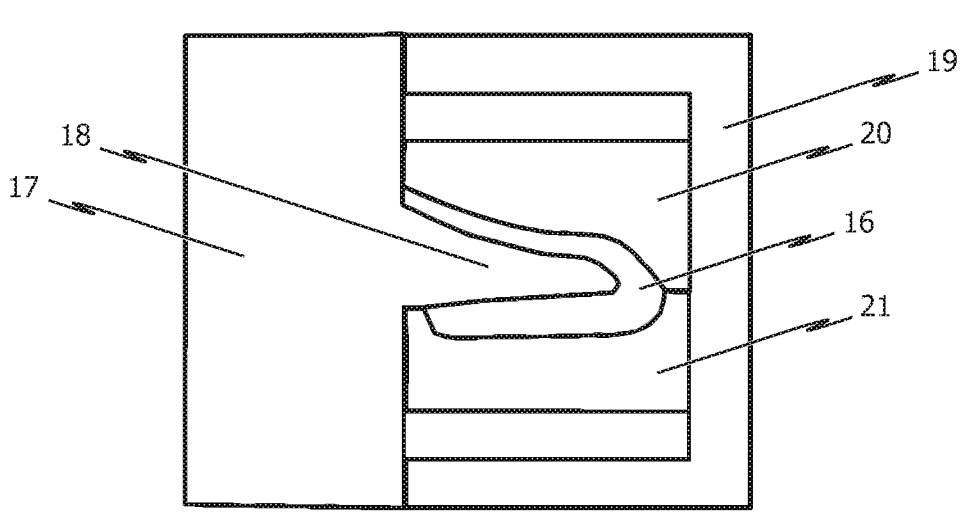
FIGS. 6A-G illustrate schematically, an exemplary embodiment of the manufacturing method according to the disclosure for manufacturing an actuating apparatus or a handle element of a door handle assembly.

To this end, as illustrated in FIG. 6A, a plastic tool 15 is used, which has a first tool half 17 and a second tool half 19. In the interconnected state of the first tool half 17 and the second tool half 19, a first cavity 16 of the plastic tool 15 is formed.

In FIG. 6A, it can further be seen that the first tool half 17 of the plastic tool 15 has a lug 18 projecting into the first cavity 16.

Figure 6B:
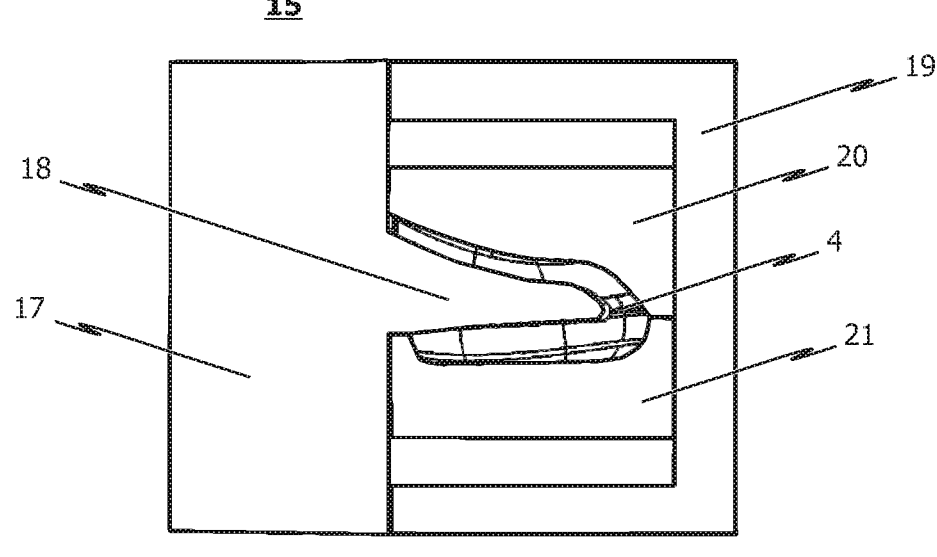

In the first cavity 16 of the plastic tool 15, as illustrated in FIG. 6B, a first plastic material is injected as a plasticized compound in order to form the carrier portion 4 of the handle element 1. The aforementioned lug 18 of the first tool half 17 projecting into the first cavity 16 ensures that the carrier portion 4 is designed at least regionally to be hollow. Specifically, the lug 18 of the first tool half 17 projecting into the first cavity 16 has a shape that is at least partially or regionally complementary to the cavity 14 of the carrier portion 4.

Figure 6C:
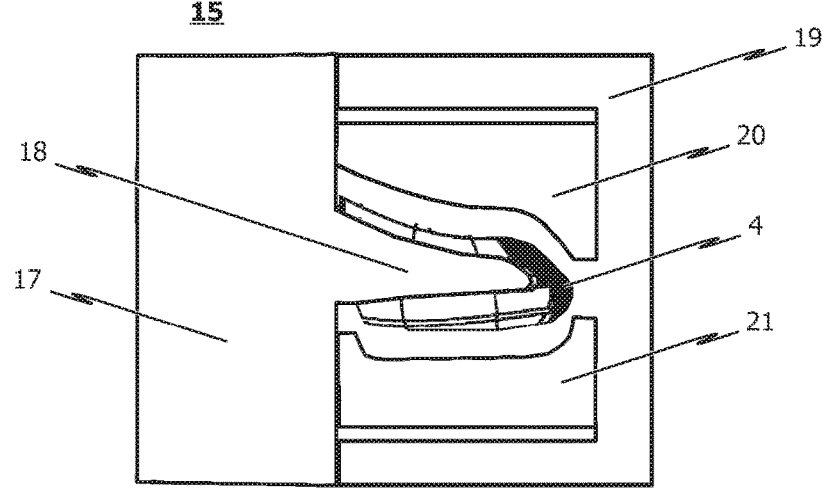
Figure 6D:
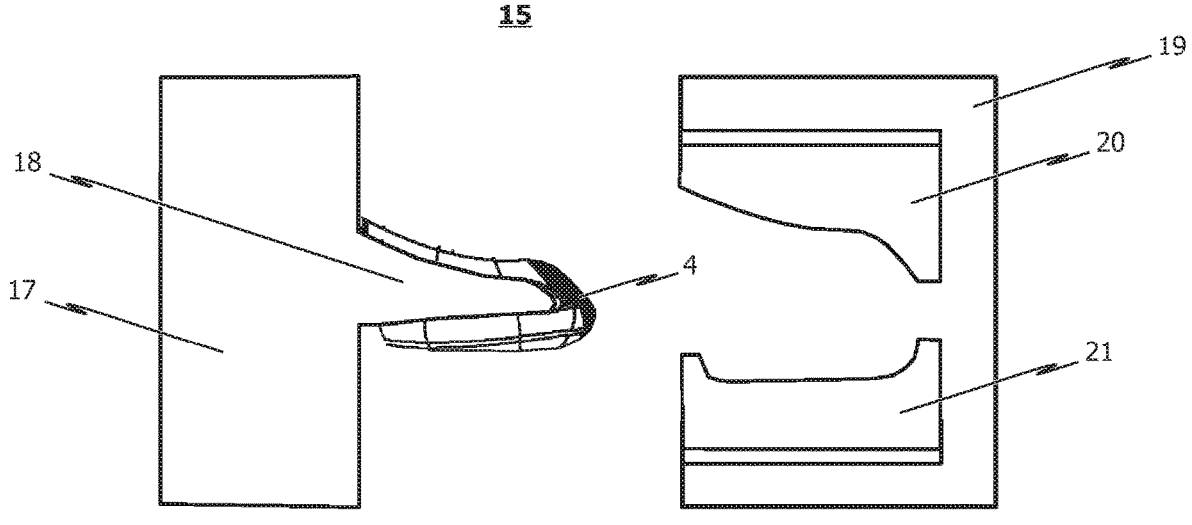
Figure 6E:
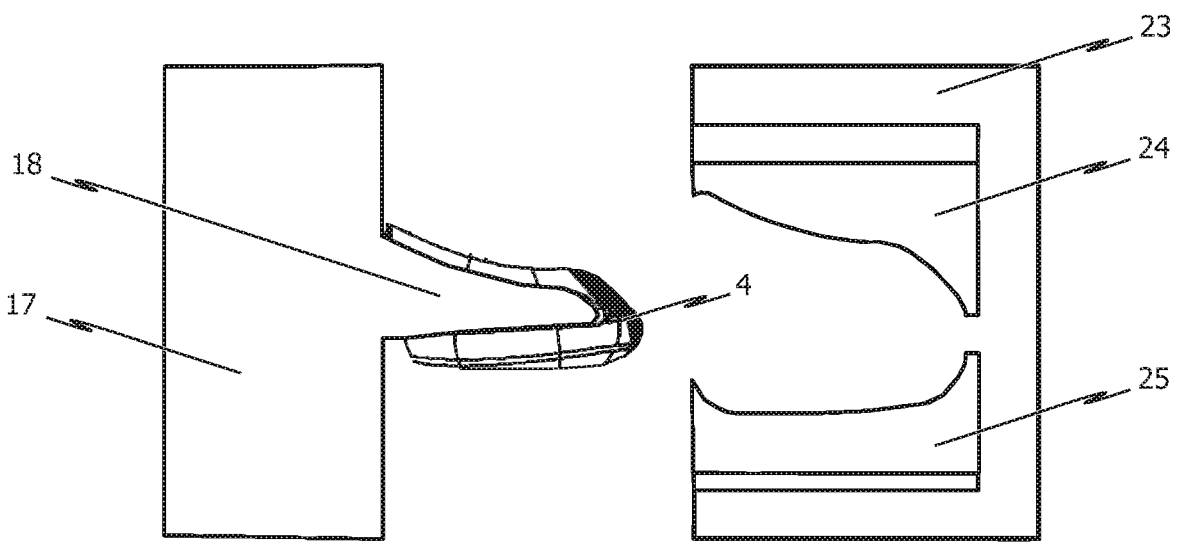

After injection of the plasticized compound into the first cavity 16 of the plastic tool 15, a tool change is carried out, as illustrated in FIG. 6C to FIG. 6E.

Specifically, the second tool half 19 of the plastic tool 15 used in order to form the carrier portion 4 has a first tool molding 20 and a second tool molding 21, which are movable and in particular slidable relative to one another and relative to the lug 18 of the first tool half 17 between a first position and a second position.

The first position of the first and second tool moldings 20, 21 of the second tool half 19 is illustrated in FIG. 6B. In this position, the two tool moldings 20, 21 form the first cavity 16 with the first tool half 17 and in particular with the lug 18 of the first tool half 17.

In the second position shown in FIG. 6, on the other hand, the first tool molding 20 and the second tool molding 21 of the second tool half 19 are in a state of being disconnected from one another compared to the first position (cf. FIG. 6B).

Figure 6F:
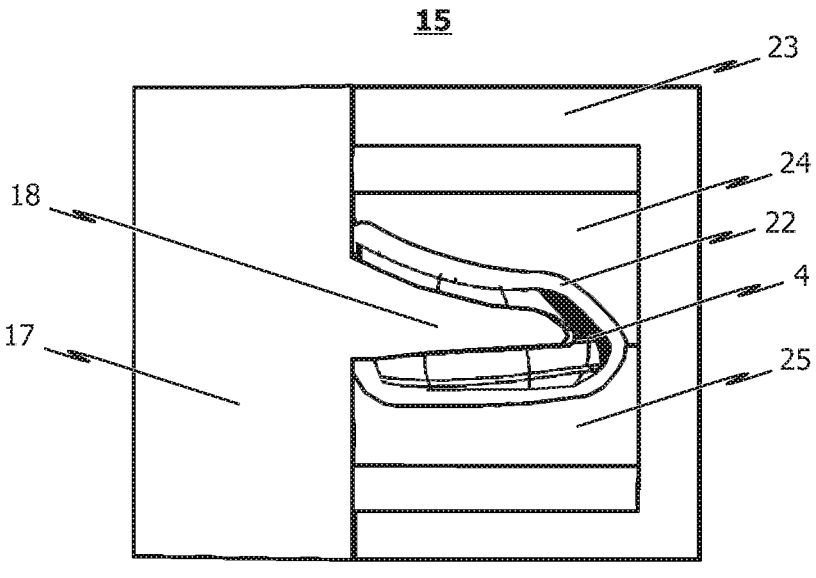

Subsequently, the second tool half 19 is replaced by a third tool half 23, as shown in FIG. 6D to FIG. 6F.

Preferably, the third tool half 23 comprises a third tool molding 24 and a fourth tool molding 25, which are movable, and in particular slidable, relative to one another and relative to the lug 18 of the first tool half 17 between a first position and a second position. In the first position of the tool moldings 24, 25 of the third tool half 23, the two tool moldings 24, 25 form a second cavity 22 with the first tool half 17 and in particular with the carrier portion 4 supported at least regionally by the lug 18 of the first tool half 17, as illustrated in FIG. 6F.

In the second position of the third tool molding 24 and the fourth tool molding 25 of the third tool half 23, on the other hand, the two tool moldings 24, 25 are in a state of being disconnected from one another compared to the first position (cf. FIG. 6D, and in particular FIG. 6E).

Figure 6G:
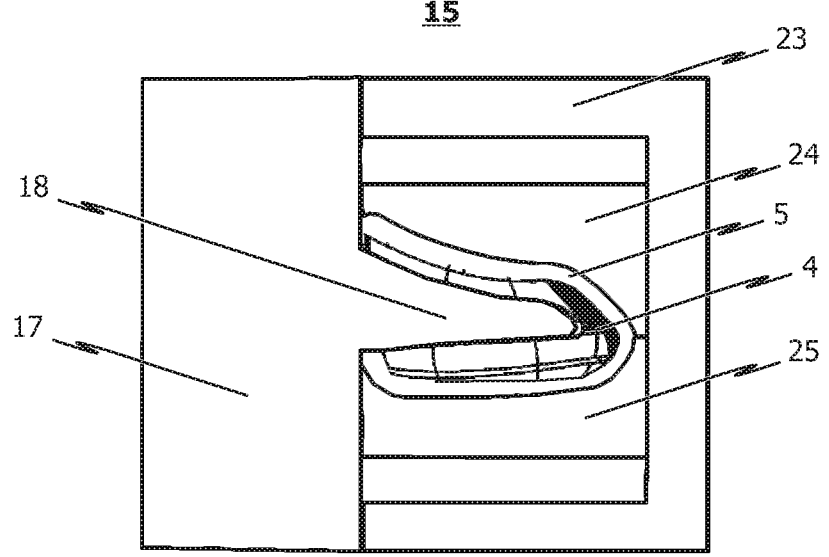

The decorative layer 5 of the handle element 1 is formed by injecting a second plastic material into the second cavity 22 of the plastic tool 15 as a plasticized compound, as illustrated in FIG. 6G.

The method according to the disclosure, as illustrated in FIG. 6A to FIG. 6G, allows a nearly complete overmolding of the carrier portion 4 with the decorative layer 5.

Figure 7A:
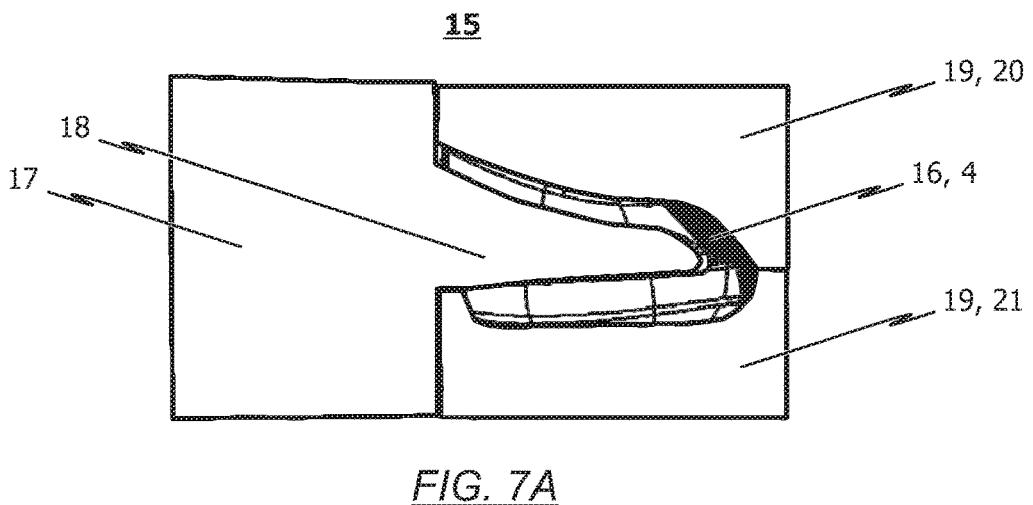
FIGS. 7A-C illustrate schematically, an exemplary embodiment of the manufacturing method according to the disclosure for manufacturing an actuating apparatus or a handle element of a door handle assembly.
Figure 7B:
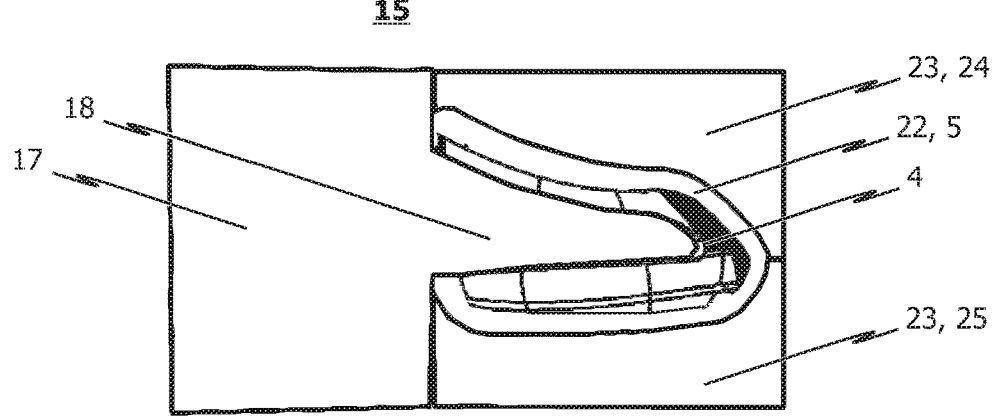
Figure 7C:
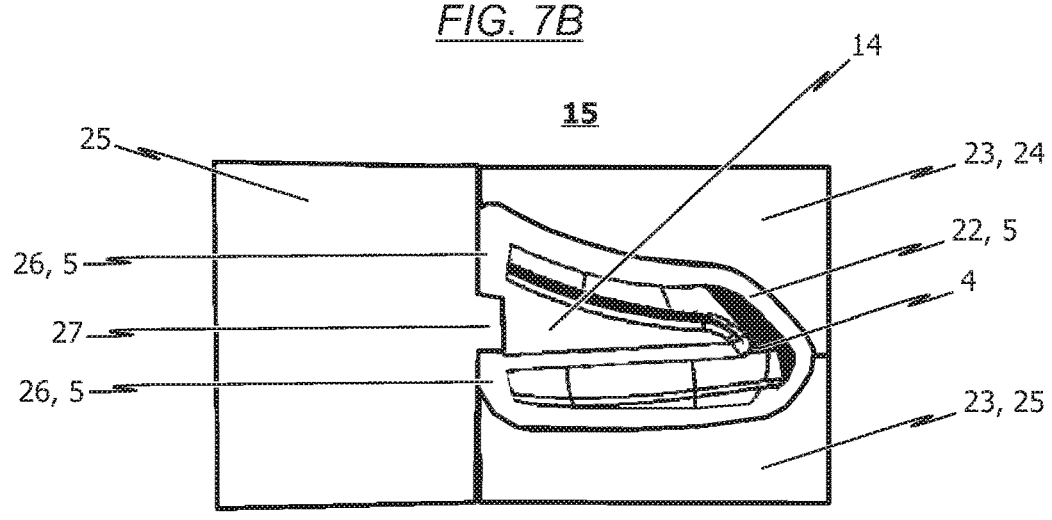

An alternative embodiment of the manufacturing method according to the disclosure is shown in FIG. 7A to FIG. 7C.

Specifically, FIG. 7A shows a state in which the plasticized compound of the first plastic material is injected into the first cavity 16 in order to form the at least regionally hollow carrier portion 4 of the handle element 1.

Then, a tool change or an exchange of the second tool half 19 with the third tool half 23 is carried out in order to form the second cavity 22 for forming the decorative layer 5. In FIG. 7B, a state is shown in which the plasticized compound of the decorative layer 5 has already been injected into the second cavity 22.

In FIG. 7C, a state is shown in which the first tool half 17 of the plastic tool 15 has been replaced by a fourth tool half 25. The fourth tool half 25 does not have a lug 18 projecting into the cavity 14 of the carrier portion 4. Rather, the fourth tool half 25 is configured such that, when connected to the third tool half 23, it forms a gap region 26 with the third tool half 23, which gap region is in fluid communication with the second cavity 22 in such a way that the plasticized compound already injected into the second cavity 22 can also flow into the gap region 26 in order to thus realize as complete a coating as possible of the carrier portion 4.

In so doing, as illustrated in FIG. 7C, the fourth tool half 25 can have a lug 27 that at least partially or regionally projects into the gap region 26 formed between the third tool half 23 and the fourth tool half 25.

In the embodiment illustrated in FIG. 7C, gas is preferably injected into the cavity 14 of the carrier portion 4. Alternatively or additionally, the cavity 14 of the carrier portion 4 can be foamed out at least regionally.

Alternatively, however, it is also contemplated to foam out the cavity 14 of the carrier portion 4 at least regionally using a sandwich injection molding method.

Figure 8:
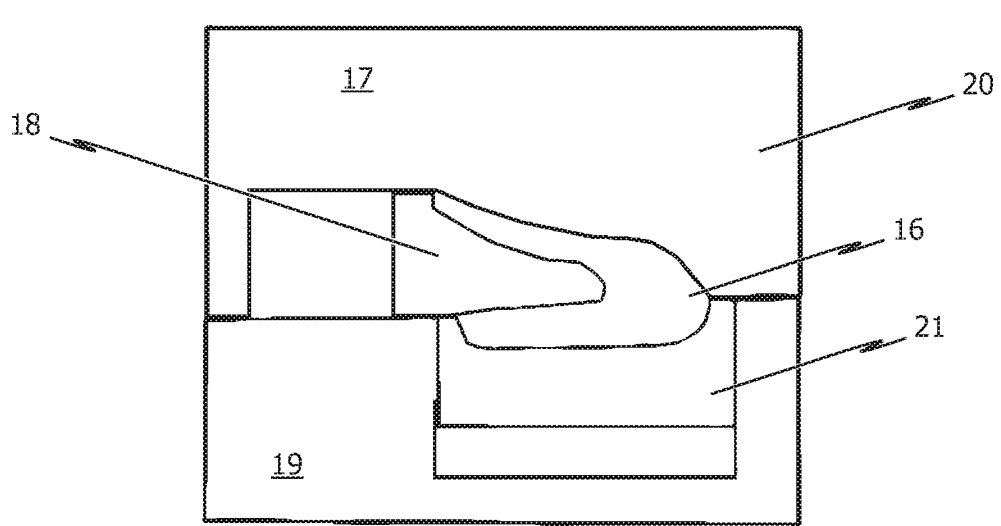
FIG. 8 illustrates schematically, an exemplary embodiment of the manufacturing method according to the disclosure that is an alternative to FIG. 6A.

FIG. 8 schematically shows an exemplary embodiment of the manufacturing method according to the disclosure that is an alternative to FIG. 6A.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

LIST OF REFERENCE NUMERALS

1 Actuating apparatus/actuating element/handle element
2 Loudspeaker

3 Bezel
4 Carrier portion
5 Decorative layer
6 Bearing block
7 Bearing means
8 Bearing region
9 First region
10 Second region
11 Edge or arcuate region
12 Housing
13 Handle recess
14 Cavity of the carrier portion
15 Plastic tool
16 First cavity
17 First tool half
18 Lug of first tool half
19 Second tool half
20 First tool molding of second tool half
21 Second tool molding of second tool half
22 Second cavity
23 Third tool half
24 Third tool molding of third tool half
25 Fourth tool molding of third tool half
25 Fourth tool half
26 Gap region
27 Lug projecting at least partially or regionally into the gap region

What is claimed is:

1. A method for manufacturing an actuating apparatus for a vehicle door handle assembly, wherein the vehicle door handle assembly comprises an inner door handle assembly, wherein the method comprises:
  forming a hollow carrier portion from a first plastic material; and
  forming a decorative layer from a second plastic material on the hollow carrier portion,
  wherein the hollow carrier portion is formed by injecting the first plastic material as a plasticized compound into a first cavity of a plastic tool,
  wherein the plastic tool comprises a first tool molding and at least one second tool molding, wherein the first tool molding and the at least one second tool molding are separate parts, which, when connected to one another, form the first cavity of the plastic tool, and
  wherein the plastic tool comprises a tool molding in the form of a lug separate from the first tool molding and the at least one second tool molding, wherein the lug protrudes into the cavity.

2. The method according to claim 1,
wherein the plastic tool comprises a first tool molding and at least one further second tool molding, which are movable relative to one another and relative to the lug between a first position in which the first and second tool moldings form the first cavity with the lug and a second position in which the first and second tool moldings are disconnected from one another compared to the first position.

3. The method according to claim 1,
wherein, in addition to the tool molding configured as a lug, the plastic tool comprises at least one further tool molding, wherein the tool molding configured as a lug and the at least one further tool molding are movable relative to one another between a first position in which the first and second tool moldings form the first cavity and a second position in which the first and second tool moldings are disconnected from one another compared to the first position.

4. The method according to claim 1,
wherein the decorative layer is formed by injecting the second plastic material as a plasticized compound into a second cavity of the plastic tool, wherein the plastic tool comprises at least two tool moldings, which, when connected to one another, form the second cavity of the plastic tool, wherein, upon injecting the second plastic material into the second cavity of the plastic tool, the previously formed carrier portion is at least partially supported by the lug.

5. The method according to claim 4,
wherein the tool molding in the form of the lug is part of a first tool mold half of the plastic tool, wherein the first and the at least one second tool moldings are part of a second tool mold half of the plastic tool, and wherein the at least two tool moldings that form the second cavity of the plastic tool when connected to one another are part of a third tool half of the plastic tool.

6. The method according to claim 4,
wherein the second cavity of the plastic tool is formed by a third tool molding and at least a fourth tool molding, which are movable, and in particular slidable, relative to one another and relative to the lug between a first position in which the two tool moldings form the second cavity with the carrier portion at least partially supported by the lug and a second position in which the two tool moldings are disconnected from one another compared to the first position.

7. The method according to claim 4,
wherein the method further comprises:
  injecting gas into the cavity of the carrier portion or at foaming out the cavity of the carrier portion,
  wherein, for injecting gas or foaming out the cavity of the carrier portion, the tool molding in the form of the lug projecting into the cavity is replaced by a tool molding which is configured without a lug projecting into the cavity of the carrier portion.

8. The method according to claim 7,
wherein the fourth tool molding is configured such that, when connected to the third tool molding, it forms a gap region with the third tool molding, which gap region is in fluid communication with the second cavity in such a way that the plastic compound injected into the second cavity is configured to flow into the gap region.

9. The method according to claim 8,
wherein the fourth tool molding comprises at least one lug at least partially or regionally protruding into the gap region formed between the third tool molding and the fourth tool molding.

10. The method according to claim 1, wherein the cavity has a shape that is at least partially complementary to the cavity of the carrier portion.

11. An actuating apparatus for a vehicle door handle arrangement, wherein the actuating apparatus is manufactured in a two-component injection molding method, and wherein the actuating apparatus comprises a carrier portion made from a first plastic material and a decorative layer integrally connected to the carrier portion and made from a second plastic material, wherein the actuating apparatus comprises a first region, which faces away from the user in the resting position of the actuating apparatus and represents the rear side of the actuating apparatus to be rearwardly engaged by the user when actuating the actuating apparatus, and a second region, which faces the user and represents the visible region of the actuating apparatus in its resting position, wherein, in the first region of the actuating apparatus, the decorative layer covers the carrier portion, and wherein, on a surface of at least 50% of the second region of the actuating apparatus, the decorative layer covers the carrier portion, and wherein the actuating apparatus is manufactured according to the method according to claim 1.

12. The actuating apparatus according to claim 11, wherein, in the first and in the second region of the actuating apparatus, the decorative layer continuously and completely covers the carrier portion.

13. The actuating apparatus according to claim 11, wherein the first region of the actuating apparatus is connected to the second region of the actuating apparatus via an arcuate region, wherein the arcuate region is continuously and completely covered by the decorative layer.

14. The actuating apparatus according to claim 13, wherein, in a bearing region of the actuating apparatus, the carrier portion comprises bearing means with which the actuating apparatus is configured to be mounted, in particular pivotably, on the vehicle door handle assembly and in particular on a housing of the vehicle door handle assembly, wherein the decorative layer completely and continuously covers the carrier portion, with the exception of in the bearing region of the actuating apparatus.

15. The actuating apparatus according to claim 14, wherein the actuating apparatus is configured as a body extending in a direction running along a major axis, wherein the bearing region of the actuating apparatus is configured in particular at an end region of the body, wherein the carrier portion in the bearing region comprises at least one bearing block, in which the bearing means are configured, wherein the at least one bearing block is connected to the first or second region of the actuating apparatus via an edge-like or arc-like region, wherein the decorative layer extends at least partially over the edge-like or arc-like region.

16. A vehicle door handle assembly, in particular an inner door handle assembly, having an actuating apparatus according to claim 11.

* * * * *